United States Patent
Markiewicz et al.

[11] 3,844,533
[45] Oct. 29, 1974

[54] AUTOMATIC STUD TENSIONER

[75] Inventors: Jan Markiewicz, North Haven, Conn.; Alfred H. Yoli, New City, N.Y.

[73] Assignee: Transfer Systems Incorporated, North Haven, Conn.

[22] Filed: Mar. 12, 1973

[21] Appl. No.: 340,338

[52] U.S. Cl. .............................. 254/29 A, 81/57.38
[51] Int. Cl. ............................................ E21b 19/00
[58] Field of Search ................... 81/57.38; 254/29 A

[56] References Cited
UNITED STATES PATENTS

| | | | |
|---|---|---|---|
| 3,008,362 | 11/1961 | Tucker | 81/57.38 |
| 3,128,990 | 4/1964 | Brooks et al. | 81/57.38 |
| 3,230,799 | 1/1966 | Maciulaitis | 81/57.38 |

*Primary Examiner*—James L. Jones, Jr.

[57] ABSTRACT

A power operated, automatic, stud tensioner adapted for use with a nuclear reactor pressure vessel is described. Means are included to provide for automatic engagement of a segmented coupling nut with the normal helical stud threads while a retaining ring is being lowered to lock the coupling nut to the stud. Also included are motor actuated means for running off the nut, and means for allowing the tensioner to align itself with the stud.

20 Claims, 10 Drawing Figures

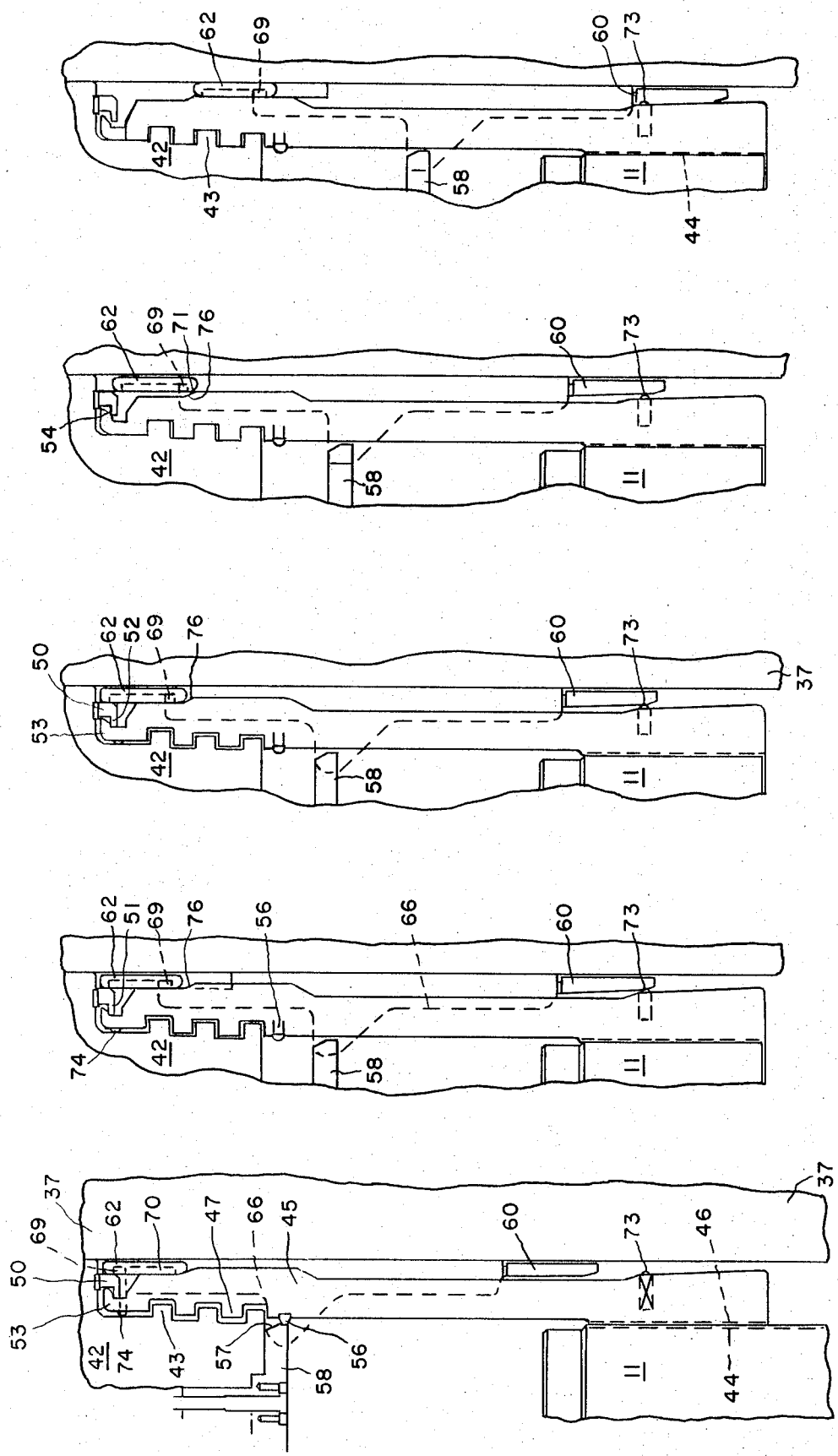

AUTOMATIC STUD TENSIONER

This invention relates to a power operated stud tensioner especially adapted for stretching the studs used for clamping the head of a pressure vessel housing a power generating nuclear reactor.

A commonly assigned copending application, Ser. No. 148,617, filed June 1, 1971, now U.S. Pat. No. 3,722,332 describes apparatus suitable for tensioning studs on a pressure vessel in the process of assembling and disassembling a closure nut. The application also contains a description of a multiple stud tensioner for simultaneously tensioning a plurality of studs. In a preferred form, the multiple tensioner is of the carousel type provided with means for indexing the tensioners from one stud to the adjacent stud. Operation of the system described requires hand assembly of a split threaded ring to the stud threads and to a separate puller rod. This is cumbersome and time consuming, especially for the typical installation where for example 92 studs are present and for each position of the carousel 23 split rings have to be hand assembled to 23 studs. Thus it would be desirable to be able to automatically establish engagement between the threaded stud and the puller rod.

U.S. Pat. No. 3,008,362 to Tucker describes a stud tensioner which includes means for automatically engaging the stud. This is accomplished by providing at the stud end non-helical coarse square threads, referred to as spaced lands, and locating a chuck with attached land engaging jaws relative to the stud lands by means of a stop located at the first helical thread on the stud below the lands. The wide pitch of the lands, as well as their bevelled edges, presumably allow for the desired engagement even where the chuck is not precisely horizontally aligned with the lands. This automatic engaging apparatus is not suitable for existing reactor installations, because the studs used in the typical pressure vessel have only fine helical threads and no coarse land structure extending above the fine threads, and the patented mechanism described will not permit engagement of the jaws to the fine helical threads, unless the jaw threads are precisely horizontally aligned with the stud threads, which is impractical to achieve by the locating means described in this patent. For instance, in the aforementioned typical installation, the stud thread pitch is about 0.01-0.015 inches. The threads actually present have flat peaks taking up approximately one-eighth of the pitch distance. Should the jaw peaks meet the stud thread peaks, engagement becomes impossible. The Tucker patent shows no way of solving this problem.

U.S. Pat. No. 3,128,990 to Brooks shows a tensioner which is adapted to engage the ordinary helical threads of a stud. This is accomplished by causing a coupling threaded nut upon rotation to engage the stud threads. This mode of engagement requires angular as well as vertical motion of the nut relative to the puller rod, which is achieved in this patented arrangement by not coupling the nut directly to the puller rod but instead making the puller rod annular and configured to engage the bottomside of the coupling nut. Such a construction could involve difficulties in establishing proper engagement between the coupling nut and the stud threads should the stud be canted relative to the coupling nut. Flange distortion is common in reactor installations causing tilting of the stud axis. Another embodiment in this patent shows a segmented coupling nut which is rotated within an inwardly-tapered, threaded puller rod until the coupling nut engages the stud threads. However, should the puller not be precisely aligned relative to the stud, it is possible for the thread peaks on the coupling nut to strike the thread peaks on the stud thread preventing engagement and possibly causing damage to the stud threads. This situation becomes further complicated when multiple tensioners are to be simultaneously engaged to multiple studs by the apparatus in the said copending application, Ser. No. 148,617, which in one embodiment interconnects the hydraulic systems. Should any of the 23 tensioners, for the example given above, fail to engage their respective stud, then the segmented nut of that tensioner will remain unloaded and no hydraulic pressure will be developed at any of the chambers associated with each of the puller rods.

The principal object of the invention is a power-operated stud tensioner capable of automatic engagement to the normal helical threads on a stud in order to reduce the time required to assemble and disassemble closure nuts on the stud.

Another object of the invention is an automatically-engaging, power-operated stud tensioner suitable for use in apparatus providing multiple tensioners for simultaneous tensioning of many studs.

In accordance with the invention, the foregoing objects are achieved by incorporating in the tensioning apparatus stud thread engaging means for effecting engagement without rotational movement, and by providing means for axially displacing the stud thread engaging means relative to the stud to enable the threaded sections to automatically align themselves into the proper stud engaging position whereupon they can be caused to engage one another.

In accordance with one aspect of the invention, the stud thread engaging means are simultaneously moved axially and radially inwardly relative to the stud until they fully engage the stud threads and are tightly clamped to the stud for a stud tensioning operation.

In a preferred embodiment in accordance with the invention, the stud tensioner comprises a pedestal which surrounds the stud and includes a hydraulically actuated stud puller rod axially aligned with the stud and means for coupling the stud to the puller rod. The coupling means includes plural threaded segments each having a first lower threaded or nut section for engaging the stud threads above the closure nut, and a second upper threaded section for engaging a threaded section on the puller rod. A small amount of clearance is provided between the second threaded section on the coupling means and the puller rod threads allowing for sufficient axial movement if necessary of the nut segments to permit horizontal alignment of the lower threaded sections with the stud threads. Retainer means are lowered onto the plural segments to cause their lateral inward displacement into engagement with the puller rod and the stud threaded end. Means are provided to cause automatic vertical displacement of the nut segments as they are displaced inward to ensure complete engagement of all threaded nut segments on the same group of stud threads.

The apparatus preferably further includes adjustable support means to allow gross alignment of each tensioner with its associated stud, and spherical bearing means to allow for final tensioner alignment with a stud that may be off-axially projecting during the actual tensioning operation.

The apparatus preferably also includes means for mechanically running off the closure nut after it has been lifted off the head flange, and for running it on during an assembly step.

Other features and advantages of the invention will appear in the detailed description that follows hereinafter of an exemplary embodiment in accordance with our invention, taken in conjunction with the accompanying drawings wherein:

FIGS. 4a–4e are schematic kinematic views to illustrate operation of the automatic engagement feature in the process of locking the coupling means to the stud;

Figures 1, 5, 6:
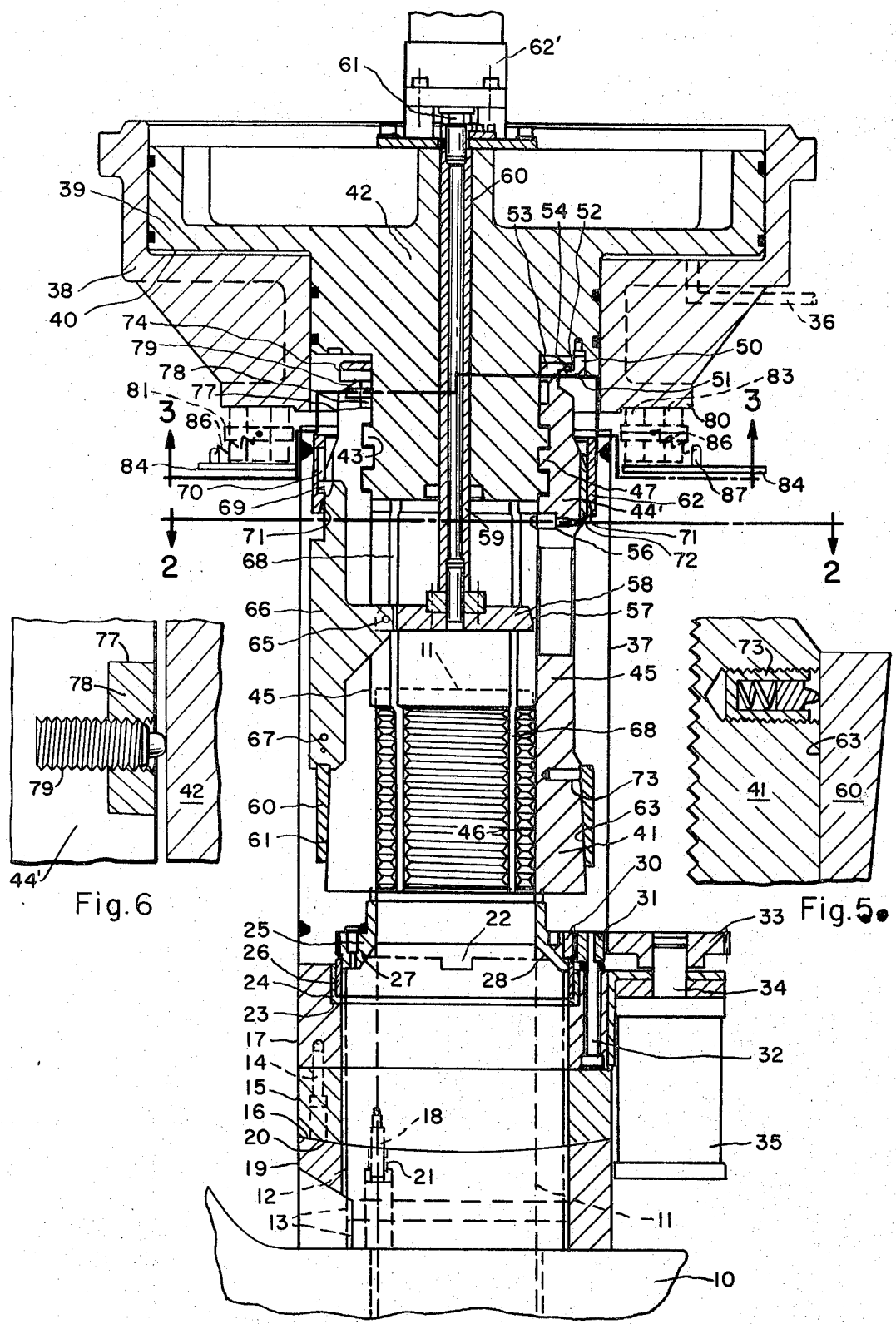
FIG. 1 is a cross-sectional partly schematic view of one form of tensioner in accordance with the invention shown located in position on the flange of a pressure vessel.

FIG. 5 is a detail vertical cross-sectional view of the spring-biased plunger 73 shown in FIG. 1, and FIG. 6 is a detail vertical cross-sectional view of the spring-biased plunger 79 and alignment ring 78 shown in FIG. 1.

The apparatus of the invention is especially adapted for assembly and disassembly of the closure nuts which clamps the head flange to a nuclear reactor pressure vessel flange which contains a plurality of upstanding studs. A typical installation contains 92 studs of about 6–8 inches in diameter and a fine helical thread on each stud. FIG. 1 is a cross-section of one form of apparatus in accordance with the invention secured to one such stud ready for a tensioning operation. Reference numeral 10 designates the head flange with a clearance hole through which projects one of the studs 11 (shown in dashed lines) anchored below to the vessel flange (not shown). A closure nut 12 screwed to the stud threads bears via several washers 13 against the head flange. The function of the tensioning apparatus is to stretch the stud a predetermined amount enabling the closure nut to be readily removed from the stud or tightened against the flange. The apparatus comprises a pedestal structure which surrounds the stud and closure nut and is supported on the head flange. The configuration of the pedestal is similar to that of the aforementioned copending application, Ser. No. 148,617, except for provision to allow for lateral movement to accommodate a tilted stud, and a motor driven closure nut runner. The former is accomplished by bolting 14 a washer 15 having a bottom spherical surface 16 to the pedestal portion 17 connected to the hydraulic system, and by bolting 18 the lowermost pedestal portion 19 having a complementary spherical surface 20 to the washer 15. However, the latter bolt 18 extends through a clearance hole 21 in the lowermost pedestal portion 19 which allows for limited lateral movement of the spherical washer 15 to enable the apparatus to align itself with a tilted stud.

The nut running feature is accomplished as follows. As is conventional, the closure nut has a castellated top 22 to receive a tool for rotating same. The pedestal portion 17 at the level of the castellated nut top is provided with a shoulder 23 for receiving an annular bearing 24 which supports for rotary movement a drive sleeve 25 comprising a skirt portion 26 which engages the bearing 24, and downwardly projecting portions 27 for seating in the grooves of the castellated nut top 22. An inside tapered surface 28 is also provided on the drive sleeve 25 for assisting in initial alignment of the apparatus with the stud 11. An external surface of the drive sleeve 25 is provided with a spur gear 30 which is engaged by an idler gear 31 mounted for rotation on a shaft 32 supported by the pedestal 17, and which idler gear is in turn engaged by a pinion spur gear 33 mounted on the output shaft 34 of a pneumatic motor 35 which in turn is supported on the pedestal portion 17.

The pedestal, which is generally rectangular in cross-section at the bottom, extends upward into an outer slotted also rectangular structure 37 similar to that of the said copending application and terminating in a widened upper cylindrical section 38 forming with a piston 39 an annular hydraulic chamber 40 into which hydraulic fluid can be pumped by means 36 shown schematically, as in the said copending application, to raise the hydraulic piston 39 relative to the cylinder 38. Extending downward from the piston 38 in a position centered with respect to the stud 11 and integral and movable with the piston is a puller rod 42 whose lower portion is provided with means for releasably engaging the coupling means. Preferably the releasable engaging means comprise a non-helical threaded section. In the embodiment illustrated, the non-helical threaded section is a coarse square thread 43 at the lower end of the puller rod 42.

Coupling means are provided for clamping to the square threaded section 43 and for releasably engaging the fine helical threads at the stud top above the closure nut 12. In the embodiment illustrated, the coupling means comprise a floating cylindrical member divided into a plurality of segments, for example four segments 45, laterally movable from an open position slightly displaced from the puller rod threaded section 43 but separated from the stud threads 44 to a closed position where the segments tightly engage both of the latter. For this purpose, each of the segments 45 is provided with a lower helical threaded section 41 with threads 46 matching that of the stud threads 44 and an upper square threaded section 44' with threads 47 substantially matching that of the puller rod threads 43. While the lower helical threads 46 exactly match the stud threads 44, the vertical heights of the square threads 47 on the upper section and that of the puller rod threads 43 are chosen so that a vertical clearance results on both sides which is equal to or slightly greater than one-half the stud thread pitch and thus allows the floating segments 45 to move vertically upward or downward a distance of about one-half the pitch of the stud threads 44.

Each of the coupling segments 45 is supported within the pedestal 37 by the puller rod 42. This is accomplished by bolting four depending hook-like members 50 to a surface of the puller rod, each hook 50 providing an inwardly directed cam end 51 defining a shoulder 52. Each of the segments 45 is provided at its upper end with an annular finger 53 having a tapered follower surface 54. The finger 53 is adapted to seat on the hook shoulder 52. Each of the segments 45 is also provided with follower means in the form of a hardened insert 56 whose end projects radially inwardly, and which is positioned to be engaged by cam surfaces 57 on the periphery of a generally square drive plate 58 which is vertically movable. The latter is accomplished by connecting the plate 58 in any suitable fashion to an actuating rod 59 axially aligned with the stud axis and extending upward through a vertical hole 60 in the puller rod and connected at its upper end to the piston rod 61 of an air-cylinder 62' mounted on top of the puller rod 42. The drive plate 58 is shown in FIG. 1 in its lowermost position.

Figure 2:
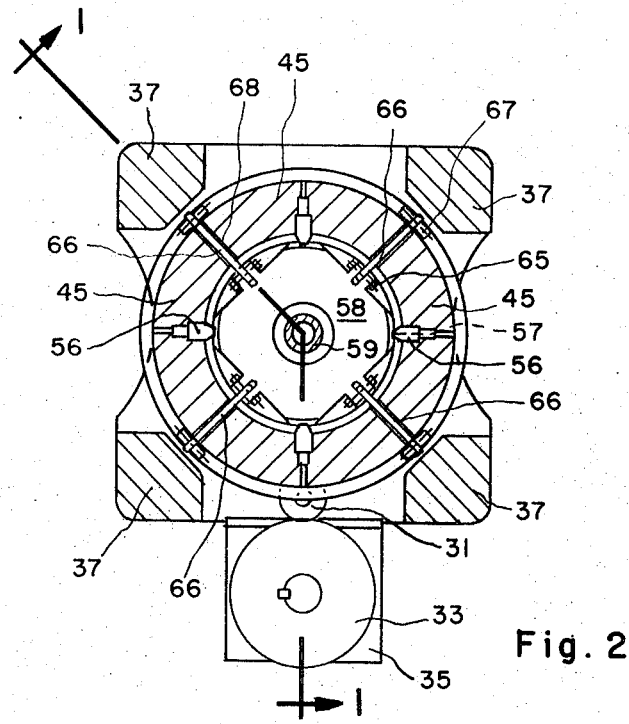
FIG. 2 is a cross-sectional view of the tensioner shown in FIG. 1 taken along the line 2—2.

The drive plate 58 actuates means to retain the segmented coupler 45 in its engaged closed position. These retainer means include a lower annular retaining ring section 60 having an inner tapered surface 61, and an upper annular retaining ring 62. The inner tapered surface 61 of the lower retaining ring 60 is adapted to mate with a complementary outer tapered surface 63 on the lower threaded sections 41 of the segments. The upper and lower retainers are connected to the drive plate 58 to be movable therewith as follows. To the center (see FIG. 2) of each side of the square drive plate 58 is bolted to form a pivotable joint 65 a center portion of a connecting link 66 whose lower end is fixedly bolted at 67 to the upper end of the lower retainer ring 60. As will be observed in FIG. 2, the four connecting links 66 extend in the vertical gaps 68 existing between the threaded segments 45. The upper end of each connecting link is formed into an outwardly extending annular finger 69 adapted to ride in an internal annular groove 70 in the upper retainer 62. The groove 70 height is chosen such that 1) when the drive plate 58 is in its lowermost position illustrated in FIG. 1 the connecting link finger 69 has engaged the groove 70 bottom wall and pulled the upper retainer 62 into its lower retaining position where it engages with a lower camming surface 71 a complementary tapered liner 72 attached to the upper threaded section 44' of the segmented coupler driving the segments laterally inward to engage the puller rod threads 43 and also tending to drive them vertically downward, and 2) when the drive plate 58 moves upward the finger 69 will ultimately engage the groove 70 top wall and push the upper retainer upward to allow a small radially outward displacement of the upper threaded sections 44' of the coupling segments, and 3) in the initial downward movement of the drive plate 58 to cause inward radial displacement of the lower segmented threaded sections 41 by means of the camming action of the lower retainer 60 without lowering of the upper retainer 62. During this interval when the lower retainer 60 is moving downward but not the upper retainer 62, the floating segments 45 are not only capable of lateral movement but also of a vertical displacement equal to about one-half the stud thread pitch in order to automatically align themselves with the stud threads to ensure complete engagement of its lower threaded section 41 to the stud threads 44. Following this alignment interval, the continued downward movement of the lower retainer 60 displaces the lower threaded sections 41 into full engagement with the stud threads 44 and simultaneously brings down the upper retainer 62.

Also provided in the lower threaded segmented section 41 are biasing means actuable by the lower retainer 60 to displace inwardly the lower sections 41 of the segmented coupler. The biasing means may be, for example, spring biased plungers 73 mounted in blind holes so that their ends project radially outwardly from the segments when the retainer 60 is in its raised position. An enlarged vertical cross-sectional view is shown in FIG. 5. As previously mentioned, additional follower means are provided in the upper segmented sections just below the square threads 47. These follower means may also be, for example, hardened inserts 56 mounted in blind holes but in this case so that their ends project radially inwardly from the segments except when actuated by the cam surfaces 57 of the drive plate 58 to displace outwardly the four segments 45. Still further biasing means are provided in the upper segment sections 44 just below the fingers 53 (see right side of FIG. 3), which engage the side of the puller rod and function to displace outwardly the fingers 53 toward their fully-engaged position with the hook 51. The latter biasing means can also be spring-biased plungers 74 similar to plunger 73 illustrated in FIG. 5 and mounted on each of the upper sections 44' such that their ends project radially inwardly as shown in FIGS. 4a and 4b. As will be observed in FIG. 3, each segment 45 contains two of the plungers 74. The same number of plungers 73 are located at the bottom of each segment, in positions generally aligned with the upper plungers 74, which is not shown. In FIG. 1, the plunger 74 shown at the left hand side is not in its true position and was added there, rather than on the right side where it properly belongs, to avoid cluttering of the illustration.

The automatic thread alignment feature will best be understood with reference to FIGS. 4a–4e which are kinematic views illustrating the coupling action under different conditions. FIG. 4a shows the fully disengaged position just after the tensioner has been positioned on the flange so as to surround the stud top 11. As will be observed, the drive plate 58 is in its uppermost position with its cam surfaces 57 engaging the cam followers 56 on the segments 45. This outward displacing action together with that of the upper plungers 74 has caused the upper segment fingers 53 to engage fully and be supported by the associated hook ends 51, and the segments 45 then pivot outward from the engaged fingers 53 and hook ends 51 as a fulcrum completely separating the lower segment threaded section 41 from the stud threads 44. The upper threaded sections 44' only partially engage the puller rod threads 43 and as shown are located approximately centered relative to the puller threads 43 leaving a vertical clearance or gap equal to or slightly greater than, which is preferred, one-half the stud thread 44 pitch both above and below the partially engaged threads 43, 47.

Now, the air cylinder 62' is actuated causing the drive plate 58 to move downwards a distance equal to the height of the groove 70 in the upper retainer 62, so that the upper retainer has not yet moved. FIG. 4b illustrates this condition assuming that the stud thread 44 peaks strike the peaks of the threads 46 on the lower threaded sections 41, preventing engagement, and FIG. 4c shows the situation assuming that the stud threads 44 and segment threads 46 are properly aligned and will engage. In the non-engaged situation depicted in FIG. 4b, the lowered lower retainer 60 has engaged the lower spring-biased plungers 73 displacing the lower segment sections 41 inward; however, due to alignment of the thread peaks, the peaks contact and no thread engagement occurs. As will be noted in FIG. 4b, the upper segment sections 44' have moved laterally partially inward due to non-engagement of the cam followers 56 and retention of the upper retainer 62 in its open position, and the upper support fingers 53 are now slightly separated from their supporting hook ends 51. In the engaged situation depicted in FIG. 4c, a similar situation prevails except that the lower threaded sections 41 have engaged the stud threads 44 due to the biasing action of plungers 73.

As the drive plate 58 continues its downward motion, the ends 69 of the connecting links 66 engage the bottom wall of groove 70 in the upper retainer 62 and pulls the latter downward. In this process, the lower cam edge 71 of the upper retainer 62 strikes the tapered surfaces 76 on the outer surfaces of the upper section 44' of the segments camming them inward and downward. Due to the available clearance between the square threads 43 and 47, and the tapered ends 54 on the fingers 53, if the lower threaded sections are not engaged as depicted in FIG. 4b thereby permitting the floating segments to move vertically downward the amount of the clearance, the segments 45 are displaced vertically until the threads 46 on the lower threaded sections 41 engage the stud threads 44, as depicted in FIG. 4d. As will be observed in the latter figure, the upper square threads 43, 47 are fully engaged but are no longer centered as in FIG. 4b. Meanwhile the lowering of lower retainer 60 and biasing means 73 has brought about inward displacement of the lower segment sections 41. The fingers 53 at the upper segment ends engage only with their tapered tips 54 the hook 51. In FIG. 4c, since the lower segment sections 41 were engaged to the stud threads 44, no verticle motion of the segments 45 is possible and none occurs.

FIG. 4e depicts the situation when the drive plate 58 has reached its lowermost position, with the connecting links 66 pushing the lower retainer 60 and pulling the upper retainer 62 to their lowermost positions. Now the segment lower sections threads 46 fully engage the stud threads 44 due to the camming action of the complementary tapers 61, 63 on the lower retainer 60 and lower segment sections 41. The upper retainer 62 in turn has brought about complete engagement of the upper threads 43 of the puller rod and the upper segment sections 44'.

The introduction of pressurized fluid into the hydraulic chamber 40 will cause lifting of the piston 39 relative to the pedestal seated on the head flange. This action transmitted by the puller rod 42 via the engaged segmented coupling means 45 will stretch the stud 11 and permit ready dissassembly or assembly of the closure nut 12 in the usual manner. In a typical nut removal sequence, the nut 12 on the stud would first be backed off several turns so that it will remain free of the flange 10 when the fluid pressure is vented from the hydraulic chamber 40. Next, the air cylinder 62' is actuated to pull up the drive plate 58. In this process, the sequence from FIG. 4e to FIG. 4c to FIG. 4a will be followed at the end of which the lower sections 41 of the four segments 45 are completely separated from the stud. Then the nut runner motor 35 is actuated causing the nut driver 25 to rotate the closure nut 12. Simultaneously the entire tensioner apparatus is lifted upward off of the stud. The motor gearing is chosen so that the nut rises at a somewhat faster rate than the entire apparatus is lifted, with the result that the driver 25 will run into the lower segment sections 41, stalling the motor 25, which is of the stalled type to permit this action without damage thereto. As the entire apparatus continues to rise, the motor 35, which remains continuously powered, will continue to run off the nut 12 until it reaches an unthreaded section on top of the stud. This procedure prevents lifting of the nut driver 25 out of engagement with the castellations 22 on top of the closure nut. If desired, to improve locking of the nut driver 25 to the nut, additional biasing means with an interposed thrust bearing (not shown) may be provided between the driver 25 and the lower parts 41 of the segments to bias the driver 25 into engagement with the nut. The nut runner can also be employed to run the nut down on the stud while the tensioner is being lowered onto the flange.

Figure 3:
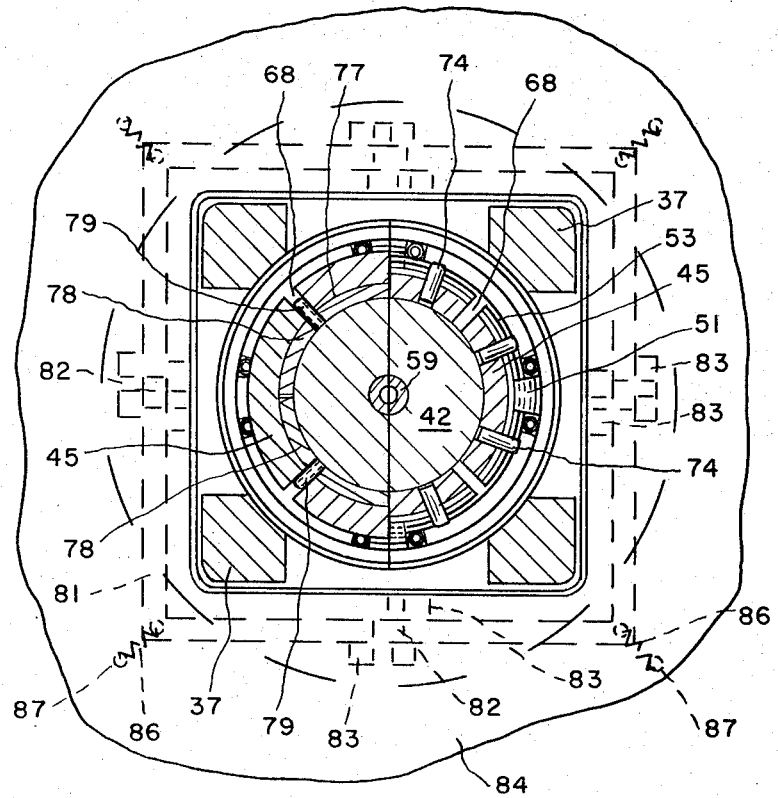
FIG. 3 is a cross-sectional view of the tensioner shown in FIG. 1 taken along the line 3—3.

To ensure that the floating segments 45 which are permitted some vertical displacement actually engage the same thread group on the stud to prevent bending of the stud during tensioning, the segments 45 are linked together by means which compel them to move vertically as a unit while still allowing individual radial displacement. This is accomplished by providing an inner annular groove 77 in each of the segments at their upper sections 44' and seating in the grooves annular segmented alignment rings 78 which span adjacent segments. This is illustrated in FIG. 3. The segmented alignment rings 78 are secured in place by spring plungers 79 threaded into through holes in the rings 78 and located in the slots 68 between adjacent segments. The spring plungers 79 are adjusted in position in the ring holes such that their biased ball ends project inwardly against the side wall of the puller rod 42 thereby maintaining the alignment rings 78 seated in their respective grooves 77. FIG. 6 is an enlarged cross-sectional view of one of the plungers 79 and rings 78.

The described apparatus in addition to providing the features already mentioned above offers the additional important advantage that the nut segments 41 are urged inwardly to seat all the way down on the stud threads, in contrast to the usual small clearance that remains when a nut is angularly rotated onto a stud thread. This full seating feature prevents shifting of the nut segments relative to the stud and lessens the possibility of stud thread damage during a tensioning operation.

In the copending application, Ser. No. 148,617, which describes the multiple tensioner in the form of a carousel, all the tensioners are supported on a common horizontal plate which engages and supports each tensioner just below where the pedestal widens to form the hydraulic chamber, which corresponds to the surface 80 of the instant case. All of the tensioners are lifted as a unit by raising the common plate. As mentioned previously, it is necessary to provide some mechanism for enabling each tensioner to align itself with its associated stud as the common plate is lowered, to take into account possible stud displacements due to normal construction tolerances, and deformations in the vessel flanges during use. In accordance with this aspect of the invention, this is accomplished by employing a gimbal mechanism for connecting the tensioner to its support or lifting means. The gimbal mechanism while especially important for the multiple tensioner apparatus is also useful for the support of individual tensioners. In a preferred form, the gimbal mechanism comprises a generally rectangular support frame 81 (FIGS. 1 and 3) containing journalled at the center of each of the four sides an eccentric shaft 82 on opposite ends of which is mounted a roller 83. The resultant assembly rests on the tensioner support in the form of a plate 84 corresponding to the common support plate of the copending application and having a hole in the center to accommodate the pedestal. Connected to the support plate 84 is the lifting and lowering means (not shown) for the tensioner. The eccentric shaft centers are journalled on the same level for opposed sides of the frame 81 but are slightly offset with respect to adjacent sides. The result is that when the gimbal mechanism is supported on the plate 84 and the tensioner rests on top as depicted in FIG. 1, the two side rollers as shown contact the tensioner surface 80 and are spaced from the support plate 84, whereas the front and back rollers (not shown) will contact the support plate 84 but not the tensioners surface 80. This support arrangement allows the entire tensioner to pivot about two orthogonal horizontal axes passing through the opposed eccentric shafts relative to the support 84. The gimbal frame 81 is secured to the support plate 84 by means of four extension springs 86 connected between the frame corners and posts 87 mounted on the support 84.

The operation will be better understood from a description of the lowering sequence of a tensioner. First, a plastic cap (not shown) with a tapered top is usually provided on the reduced diameter top of the stud to assist in aligning the tensioner and also protect against inadvertent stud thread damage. Then when the tensioner is located generally in line with the stud, the plate 84 is lowered lowering the tensioner. The first engagement of the tensioner and the stud will occur when the taper 28 on the nut driver 25 engages the plastic cap providing a gross alignment of the tensioner with the stud, any necessary tensioner motion being taken up by an adjustment in the lateral position of the gimbal. Lowering of the tensioner is continued until the pedestal bottom is about one-eight inch above the flange. The tensioner is stopped, and while still supported by plate 84, air cylinder 62' is actuated as previously described to cause engagement of the segmented coupler with the stud threads, in which process final alignment occurs between the tensioner and the stud and the two now are coaxial, any necessary tilting of the tensioner being accommodated by the gimbal. The plate 84 is now lowered until the gimbal disengages from the tensioner surface 80, the support frame 81 immediately recentering itself by the action of the four tension springs 86 and is thus properly positioned for the next tensioning sequence. Now pressurized fluid may be introduced into the hydraulic chamber 40. Since the piston 39 is fixed to the stud via puller rod 42 and the segmented coupler, the cylinder 38 and attached pedestal will move downward the remaining one-eighth inch or so until the pedestal bottom 19 engages the head flange 10, as depicted in FIG. 1. If the seating contact of the pedestal 19 with the flange 10 is other than planar or complete, the spherical surfaces 16 and 20 will take up the difference. Continued fluid introduction will now bring about stretching of the stud. After unlocking of the nut and disengagement of the segmented coupler from the stud, the plate 84 is lifted causing reengagement of the gimbal with the tensioner lifting surface 80 and lifting of the tensioner off of the stud. If desired, a flexible link (not shown) can be provided between the tensioner and the lifting plate 84 to ensure that the two remain coupled together.

It will be understood that many variations are possible within the scope of our invention. For example, the nut runner feature is not essential and the automatic alignment feature can be employed without automatic running off or on of the nut. Further, other means besides those described can be used for aligning the tensioner with the stud. It will also be clear that the tensioner described can also be provided in multiple form in a multiple tensioner apparatus as described in said copending application and supported in the carousel apparatus described therein in the same manner as the manual tensioners.

The automatic alignment feature of this invention is not limited to the tensioner construction described in which the segmented coupler is connected automatically both to the stud threads and also to a puller rod located above the stud. In a copending application, Ser. No. 190,097, filed Oct. 18, 1971, assigned to the same assignee, there is described a modified tensioner in which the hydraulic chamber is located below the segmented nut and no puller rod is present. The automatic alignment feature described in this case can also be applied to that tensioner, which also uses a segmented nut which is applied to the stud threads and held in place by a single retainer ring. This is readily accomplished by supporting the nut segments in a floating manner on a hook similar to 51 which in turn is supported on the hydraulic system, and providing biasing means similar to 73 and 74 to cause the segments to pivot if the segment thread peaks engage the stud thread peaks, and allowing vertical displacement of the segments as the retainer is brought down and engages the segments until the latter can fully engage the stud threads in the same manner as is described in this application.

What is claimed is:

1. Apparatus for tensioning a stud having helical threads for assembly or disassembly of a closure nut engaging said helical threads, comprising a pedestal, hydraulic means comprising a piston and cylinder, one of the piston and cylinder being connected to the pedestal, means for introducing pressurized fluid into the hydraulic means, a puller rod connected to the other of the piston and cylinder and having a threaded section, means for detachably coupling to the stud helical threads above the closure nut, said detachable coupling means comprising plural segments carried by the puller rod and each having a first helical threaded section for engaging the stud helical threads and a second threaded section for threaded engagement with the puller rod threaded section, the segments first threaded sections having a smoothy tapered external surface, means for coupling together the plural segments forcing them to move vertically as a unit, means for effecting threaded engagement between the plural first threaded sections and the stud threads above the closure nut and without rotating the plural segments, said engagement effecting means comprising a smoothly tapered lower annular ring for engagement with the tapered external surface of the segments first threaded sections when moved downward for displacing the plural segments laterally inward and means operative upon a non-threaded-engagement meeting of the segments first threaded sections with the stud threads to cause a small vertical displacement of the plural segments until complete threaded engagement of the segments first threaded sections and the stud threads occurs, said vertical displacement means comprising an upper annular retaining ring for engagement with the segments second threaded sections, means for driving the smoothly tapered lower annular ring downward, and means operative upon downward motion of the lower annular ring to move downward the upper retaining ring into engagement with the segments second threaded sections, said last-named means not being operative to move the upper retaining ring until the lower annular ring has been displaced a certain distance.

2. Tensioning apparatus as claimed in claim 1 wherein means are provided operative upon initial downward movement of the lower annular ring for biasing the plural segments toward their stud thread engagement position.

3. Tensioning apparatus as claimed in claim 1 wherein means are provided operative upon upward motion of the retainer driving means for outwardly displacing the plural segments to disengage same from the stud threads and puller rod.

4. Apparatus for tensioning a stud having helical threads for assembly or disassembly of a closure nut engaging said helical threads, comprising a pedestal, hydraulic means comprising a piston and cylinder, one of the piston and cylinder being connected to the pedestal, means for introducing pressurized fluid into the hydraulic means, means for detachably coupling to the same stud helical threads which can be engaged by the closure nut, said detachable coupling means comprising plural segments each having a first helical threaded section for engaging the stud helical threads, said plural segments being suspended in a vertical position from the other of the piston and cylinder in such manner as to surround the stud and as to enable radial displacement and vertical displacement of the segments relative to the pedestal, means for effecting engagement and disengagement between the plural first threaded sections and the stud threads above the closure nut and without rotating the plural segments, said engagement effecting means including means for displacing the plural segments laterally inward and means operative upon the segments first threaded sections contacting but not entering into theaded engagement relation with the stud threads to cause the plural segments to be displaced vertically until such threaded engagement can occur, and means for retaining the detachable coupling means in engagement with the stud threads.

5. Tensioning apparatus as claimed in claim 4 and further comprising a puller rod located above the stud and having a threaded section, and the plural segments each comprise a second threaded section for threaded engagement with the puller rod threaded section.

6. Tensioning apparatus as claimed in claim 1 wherein the upper retaining ring comprises a groove, and finger means are provided connected to the lower annular ring driving means and engaging the groove in the upper retaining ring, the vertical dimension of the said finger being smaller than the corresponding dimension of the groove.

7. Tensioning apparatus as claimed in claim 4 and further including means connecting together the segment engagement effecting means and the retaining means.

8. Tensioning apparatus as claimed in claim 7 and further including means operable upon actuation of the retaining means to effect engagement of the coupling means and the stud threads before the retaining means reach their final segment retaining position.

9. Apparatus for tensioning a stud having a continuous helical threaded section for assembly or disassembly of a closure nut engaging the threads of said helical threaded section: comprising a pedestal; hydraulic means comprising a piston and cylinder, one of the piston and cylinder being connected to the pedestal, and means for introducing pressurized fluid into the cylinder; means comprising plural segments for detachably coupling to the same threads of the stud helical threaded section engaged by the closure nut, said plural segments each having a helical threaded section for engaging the stud helical threads, and means for supporting the plural segments on the other one of the piston and cylinder so as to surround the stud, said segment support means enabling lateral and vertical displacement of the segments relative to said other one of the piston and cylinder; and means for causing threaded engagement between the segment threaded sections and the stud helical threads and without rotating the plural segments, said engagement causing means comprising means for biasing the segments inwardly to bring about contact of its threaded sections with the stud threaded section, and means for imparting to the plural segments subsequent to the time they contact the stud threaded section and while they are still being biased inwardly a force capable of vertically displacing the plural segments if they are not in threaded engagement with the stud threads a sufficient distance to bring about said threaded engagement.

10. Tensioning apparatus as claimed in claim 9 wherein the supporting means for the plural segments comprises a puller rod having hook means, said segments having finger means engaging the puller rod hook means in such manner as to enable radial and vertical displacement of the segments.

11. Tensioning apparatus as claimed in claim 10 wherein the puller rod has a threaded section comprising square threads, and the plural segments each have second threaded sections also comprising square threads for engaging the puller rod threaded section, said puller rod square threads and said second section square threads having dimensions such that when centered relative to one another a clearance exists between the threads on each side equal to about one-half the stud thread pitch.

12. Tensioning apparatus as claimed in claim 9 and further including means for coupling together the plural segments forcing them to move vertically as a unit.

13. Tensioning apparatus as claimed in claim 9 and further including means for releasably engaging the closure nut, and motor means coupled to the closure nut engaging means for rotating same.

14. Tensioning apparatus as claimed in claim 13 and including means for lifting the apparatus, the motor means being adapted to rotate the closure nut so as to cause it to be vertically displaced at a rate equal to or in excess of the rate at which the apparatus is lifted.

15. Tensioning apparatus as claimed in claim 9 and including means coupled to the pedestal for lifting the apparatus, said coupling means including a gimbal mechanism allowing horizontal pivoting action of the pedestal relative to the lifting means about two orthogonal horizontal axes.

16. Tensioning apparatus as claimed in claim 15 and further including bearing means in the foot of the pedestal allowing for alignment of the apparatus with an off-axially directed stud.

17. Tensioning apparatus as claimed in claim 1, wherein the puller rod threaded section comprises square threads and the second threaded sections also comprise square threads, said puller rod square threads and said second section square threads having dimensions such that when centered relative to one another a clearance exists between the threads on each side equal to about one-half the stud thread pitch.

18. Tensioning apparatus as claimed in claim 17 wherein the segments are floatingly suspended within the pedestal such that when the first section threads are exactly aligned with the stud threads, the second section threads are centered with respect to the puller rod threads.

19. A method of tensioning a stud traversing a flange to assemble or disassemble a flange bearing closure nut, comprising the steps of locating over the stud, tensioner apparatus comprising a pedestal having a foot for engaging the flange, alignment means, hydraulic piston and cylinder of which one is connected to the pedestal, and detachable coupling means for the stud connected to the other of the piston and cylinder, lowering the tensioner apparatus until just before the pedestal foot engages the flange, threadingly engaging the coupling means to the stud while the apparatus remains free of the flange, and then introducing pressurized fluid between the piston and cylinder to cause the pedestal first to move downward until the flange is engaged and then to cause the stud to be tensioned, any misalignment of stud, flange and tensioner being taken up by the alignment means.

20. A method as set forth in claim 19 wherein the alignment means comprises gimbal means for supporting the tensioner, and spherical bearing means located at the foot of the pedestal.

* * * * *